Jan. 10, 1961 W. E. KUENTZEL 2,967,639
HIGH PRESSURE CLOSURE
Filed Feb. 8, 1957
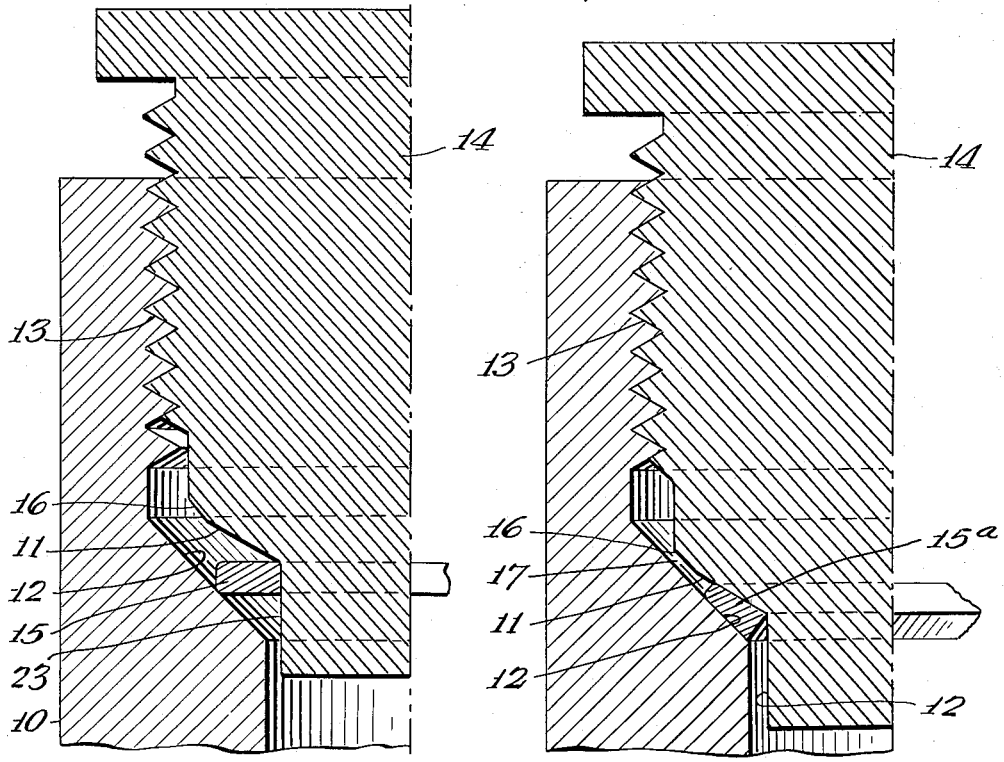
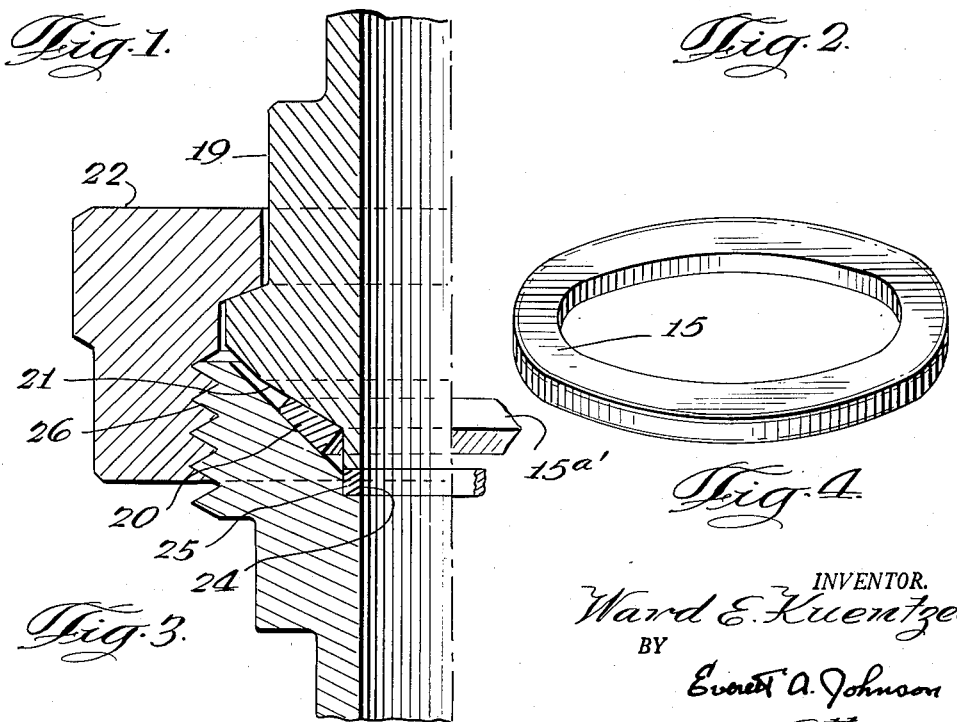
INVENTOR.
Ward E. Kuentzel
BY
Everett A. Johnson
Attorney

United States Patent Office 2,967,639
Patented Jan. 10, 1961

2,967,639

HIGH PRESSURE CLOSURE

Ward E. Kuentzel, Whiting, Ind., assignor to Standard Oil Company, Chicago, Ill., a corporation of Indiana Filed Feb. 8, 1957, Ser. No. 638,993

4 Claims. (Cl. 220—46)

This invention relates in general to pressure vessel closures and in particular comprises an improvement in the type of closure which embodies a cap or plug in conjunction with a sealing ring.

Heretofore, many types of pressure vessel closures have been proposed, but each has been deficient for one reason or another. For example, when a threaded closure is used, the closure threads are ordinarily exposed to the contents of the vessel resulting in contamination by thread lubricants, galling, or seizure of threads if lubricant is omitted to prevent such contamination, corrosion and consequent damage to the threaded portion.

In other embodiments, the radial component of the sealing force has tended to mushroom the ends of tubular vessels, thus causing looseness in threads, weakening of the closure, and the necessity for providing larger diameter gaskets when a gasket is changed.

Still another difficulty has been that the threaded portion of a tubular vessel is subjected to the internal pressure; threading decreases the thickness of the wall, and consequently the vessel is weaker than the original tubing.

Other closures consist of flat ring gaskets compressed between cover and vessel or between flanges attached to tubular vessels by means of bolting or other conventional means. These all suffer from the defect of not being self-sealing. Where other than flat gasket rings have been used, they are reasonably satisfactory from the self-sealing standpoint at high pressures, but are likely to fail at lower pressures or on heating to high temperatures. In addition, they are difficult and expensive to fabricate. Further, the gaskets must be made of metal with the same coefficient of expansion as the tube or vessel. Otherwise, leakage occurs on cooling or reheating after cooling or even after temperature fluctuates after normal use of the sealed high pressure vessel. This involves using the same or similar metals for gasket and for the vessel and, in many instances, this is neither practicable or effective. For example, in the case of stainless steel, an edge of a stainless steel gasket will damage the angle seat in a tube wall.

It is, therefore, a primary object of my invention to provide a simple and fool-proof, self-sealing closure which is particularly adapted for use on any type of closure but particularly adapted for use on threaded closures for high pressure vessels. An additional object of the invention is to provide a self-sealing closure which is convenient to use and which avoids the difficulties outlined above. Still another object of the invention is to provide a self-sealing closure which is of relatively inexpensive construction and which embodies commercially available components. These and other objects of the invention will become apparent as the description thereof proceeds.

Briefly, I attain the object of my invention by machining an angle seat into the walls of the vessel below the internal threaded portion. In this way, the threads are not exposed to the contents of the vessel making contamination of contents by thread lubricant impossible. Therefore, the threads can be freely lubricated while eliminating the danger of galling or seizing and corrosion of threads by the vessel contents. Further, the threaded portion is not subjected to the internal pressure of the vessel and, therefore, the vessel is as strong as the original tubing.

A flat ring gasket of rectangular cross-section is interposed between the bi-angular cover seat and the angular body seat. The gasket may be made by either machining in a lathe or by stamping from sheet material.

In the process of sealing, the thin flat ring gasket of initially rectangular cross-section is formed in situ into an angular-shaped ring with a wedge-like cross-section. This is accomplished by the action of the force applied by screwing or pressing the closure cover into the vessel.

The angular difference between the two seats forms the rectangular cross-section gasket into a wedge-like gasket with its broadest face exposed to the pressure of the vessel. Any internal pressure acts on the inner face of the gasket to deform it into the narrower portion between the non-parallel seats, thus wedging the gasket tighter and increasing the effectiveness of the seal. Thus, my closure is strictly self-sealing. Further, gaskets of the same metal as the vessel metal may be used without causing any damage to the seats. Thus stainless steel gaskets can be used with stainless steel vessels which can be heated and cooled rapidly without leakage, and may be reused again and again.

Further advantages and details of my invention will be described more fully by reference to preferred embodiments thereof illustrated in the accompanying drawings wherein:

Figure 1 is a longitudinal fragmentary section of the closure and vessel with the flat rectangular cross-section sealing ring in its initial position, i.e. at the moment of contact of the ring with angular seat in the vessel wall;

Figure 2 is a view similar to that of Figure 1, but wherein the gasket is in its deformed wedge-like, self-sealing position;

Figure 3 is a sectional view of another embodiment of my closure applied to tubulators or high pressure couplings; and Figure 4 is a view showing the details of the closure ring in its initial form.

Referring to the drawings, the pressure vessel 10 is provided with a closure having a bi-angular seat 11. The seat 12 in the vessel wall is positioned below the internal threads 13 in the vessel walls and forms an angle of less than 90° with the longitudinal axis of the vessel 10. The seat 11 on the internal end of the cover 14 forms an angle of 90° or less with the longitudinal axis of the cover 14. Thus, the angular seats 11 and 12 form an acute angle between their surfaces. A flat ring gasket 15 (Figure 1) of substantial thickness is deformed in situ to conform to the acute angle between the seats 11 and 12 and to press against the two angle seats 11 and 12, respectively, to form a gas-tight, self-sealing closure (Figure 2).

When the flat metal gasket 15 is compressed between the angle seats 11 and 12 in the cover 14 and in the vessel body respectively, the cross-section of the gasket 15 is deformed into a self-sealing angular gasket 15a (Figure 2) of wedge-like cross-section between the cover 14 and body seats 11 and 12 without the necessity of difficult and expensive pre-machining.

A clearance angle 16 may be required on wide cover seats equal to the angle of the body seat 12 thereby permitting progressive compression of the gasket 15 and extrusion of the apex of the wedge-like gasket 15a into the clearance 17 without interference with the body seat 12.

Gasket 15 may be of any deformable material. For high temperature, a metal having the same coefficient of expansion as the vessel material may be preferred so that all components may expand equally. For low or moderate temperatures, metal gaskets are suitable, but gaskets made of molded plastics, rubber, and the like may also be used. The gaskets in all cases may be of rectangular cross-section. However, with very acute angle seats, the cross-section of metal gaskets may, for ease of deformation, be modified to be thinner at the outer periphery than on the inside. For small vessels and for tubulators on large vessels, a gasket having a thickness of 1/16 inch and width of about 1/8 inch is suitable. On larger vessel closures, the face width of the gasket may be 0.25 to 0.5 inch and the thickness correspondingly 0.125 to 0.25 inch.

Referring to Figure 3, I have illustrated the adaptation of my invention to a tubular or double coupling. This includes the female connector 18 and the male connector 19, each provided with an angle seat 20 and 21 with the gasket 15a' interposed the seats. The connecting ring 22 draws the two members 18 and 19 together, deforming the gasket 15a' between the angle seats 20 and 21 as described above with respect to the vessel closure of Figures 1 and 2.

The gasket 15a' is mounted upon a skirt 23 which depends from the male connector 19 and which is adapted to enter the recess 24 in the connector member 18. A thrust ring 25 may be provided between the skirt 23 and the recess 24 so as to provide a continuous tubular interior in the region of the tubulator or connector.

It will be noted that in this construction, as in the construction illustrated by Figures 1 and 2, the threads 26 are not exposed to the pressure fluid and all of the advantages of the closure are also included in the embodiment of Figure 3.

A closure of the type described herein was installed on a 1.5 inch pipe size stainless steel vessel 10 having an angle seat 12 at 45° and a cover 14 having seat 11 at 60° to the axis of the vessel. Thus the angular seats 12 and 11 form an acute angle of about 15° between their surfaces. A stainless steel gasket of 1.350 inches O.D. x 1.100 inches I.D. x 1/16 inch thick was used to successfully seal 1000 p.s.i.g. to 1500 p.s.i.g. hydrogen pressure in a 65-hour test during which the closure was heated in a furnace to 900° F., cooled to 400° F., reheated to 900° F., cooled to 335° F., again heated to 900° F. and held for one hour at this temperature, cooled to 230° F., heated to 1000° F., and then allowed to cool overnight after which it was again heated to 980° F. and cooled rapidly to room temperature. No loss in pressure was observed over this entire drastic temperature variation test.

The pressure was then released and the seal opened for inspection. Both faces of gasket 15 had conformed to the angle cover and body seats 11 and 12 to form the conical wedge-shaped gasket 15a and the body seat 12 was not damaged by the deforming process although the gasket 15 had been initially arranged transverse to the axis of the cover 14 and one edge of the gasket 15 contacted the angle body seat 12. The seal was then made up again without changing gasket 15a, pressured to 1000 p.s.i.g. and reheated to 900° F. twice with cooling to substantially room temperature between and after the second heating with no loss of pressure. This clearly demonstrates that the gasket 15 when constructed and installed in accordance with my invention can be reused with no loss of efficiency and that I have attained the objects of my invention.

It is contemplated that the described structure may be used for high pressure or high vacuum installations. However, when the system is intended for use on high vacuum, the angles of the body seat 12 and cover seat 11 should be reversed with respect to a base plane transverse to the axis so as to preserve the wedging action on the deformed gasket 15. It is further contemplated that the seat 12 may be provided by the inner wall of an angular channel and seat 11 by a non-parallel mating face in a second channel in the cover.

Although I have described my invention by reference to preferred embodiments thereof, it should be understood that these are by way of illustration only and that modifications can be made in the apparatus and in the mode of using the apparatus in view of my description thereof without departing from the spirit and scope of my invention.

What I claim is:

1. A pressure sealing closure adapted for use on high pressure systems which closure comprises a first member having a tapered recessed seating surface, a second member having a frusto-conical seating surface of a different taper than said recessed seating surface, said seating surfaces defining a tapered annular interval which decreases in radial cross-section away from the longitudinal axis of said members, a projection on said second member coaxial with said frusto-conical surface and merging therewith to form an obtuse angle, said projection extending into said first member and beyond said recessed seating surface; means engaging said members to make up the closure and prevent separation of said members; a sealing ring about said projection in contact therewith and confined between said tapered seating surfaces, said ring being of wedge-shaped radial cross-section with its broadest face exposed to the retained pressure and an edge thereof providing the contact with said projection, said sealing ring initially being of rectangular cross-section and having substantial thickness and formed in situ when the closure is made up, said projection acting to restrain said ring during the deforming thereof into said wedge-shaped cross-section.

2. A pressure sealing closure adapted for use on high pressure systems which closure comprises a first member having a tapered recessed seating surface, a second member having an inner frusto-conical seating surface of a different taper than said recess surface, an outer frusto-conical surface substantially parallel to said recessed seating surface, said seating surfaces defining a tapered annular interval which decreases in radial cross-section away from the longitudinal axis of said members with a clearance angle provided between said outer frusto-conical seating surface and said recessed seating surface, a projection on said second member coaxial with said frusto-conical surface and merging therewith to form an obtuse angle, said projection extending into said first member and beyond said recessed seating surface; means engaging said members to make up the closure and prevent separation of said members; a sealing ring about said projection in contact therewith and confined between said tapered seating surfaces, said ring being of wedge-shaped radial cross-section with its broadest face exposed to the retained pressure and an edge thereof providing the contact with said projection, said sealing ring initially being of rectangular cross-section and having substantial thickness and formed in situ when the closure is made up, said projection acting to restrain said ring during the deforming thereof into said wedge-shaped cross-section.

3. The closure of claim 2 wherein said recessed seating surface is at an angle of about 45° to the longitudinal axis of said members and said frusto-conical seating surface is at an angle of about 60° to said longitudinal axis.

4. The closure of claim 2 wherein said first and second members and said sealing ring are stainless steel.

(References on following page)

References Cited in the file of this patent

UNITED STATES PATENTS

| | | |
|---|---|---|
| 1,992,793 | Welter | Feb. 26, 1935 |
| 2,102,774 | Williams | Dec. 2, 1937 |
| 2,226,494 | Jacocks | Dec. 24, 1940 |
| 2,278,882 | Jacocks | Apr. 7, 1942 |
| 2,305,590 | Marburg et al. | Dec. 22, 1942 |
| 2,582,995 | Laurent | Jan. 22, 1952 |
| 2,687,229 | Laurent | Aug. 24, 1954 |

FOREIGN PATENTS

| | | |
|---|---|---|
| 538,517 | Great Britain | Aug. 7, 1941 |